United States Patent Office 2,971,606
Patented Feb. 14, 1961

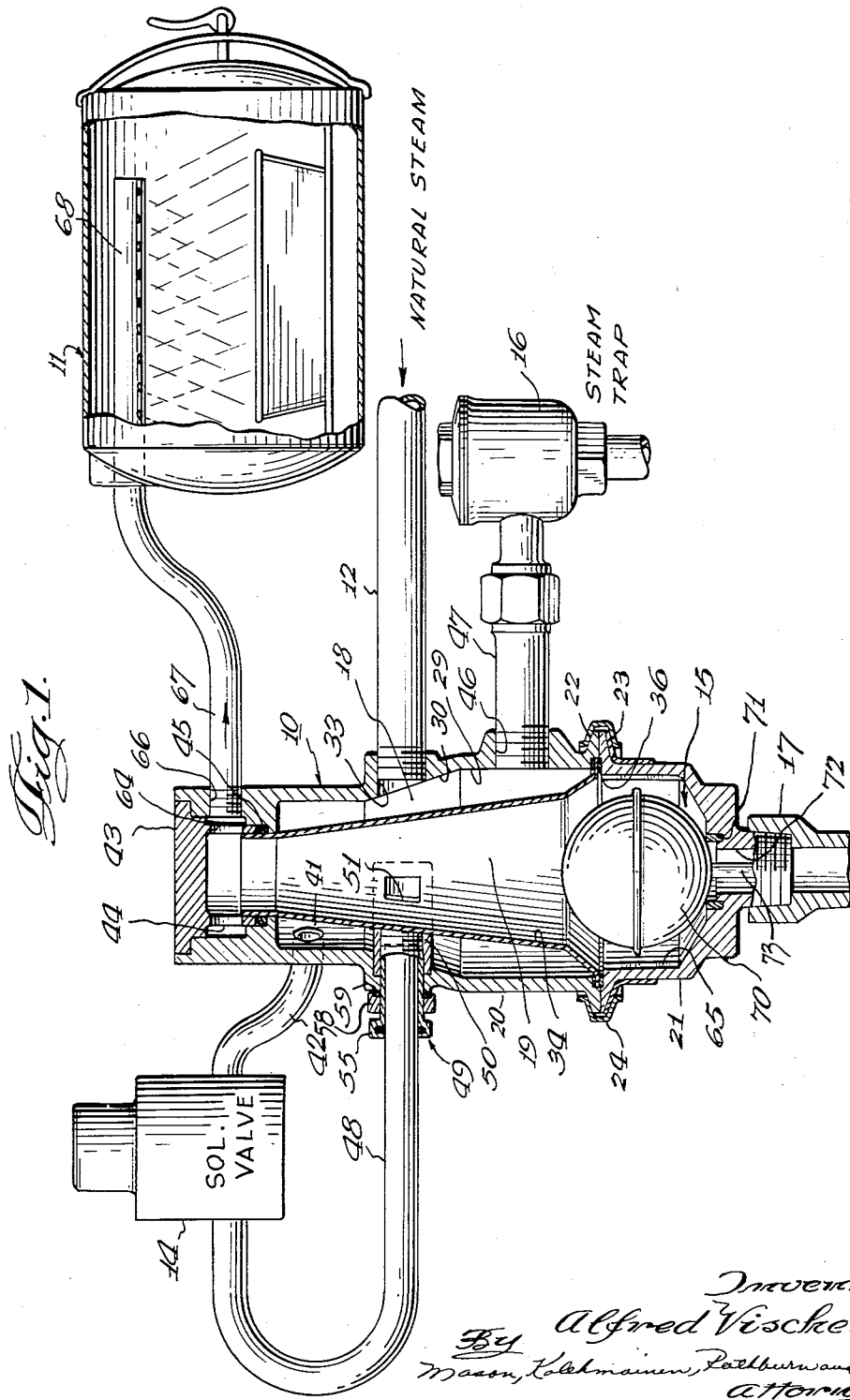

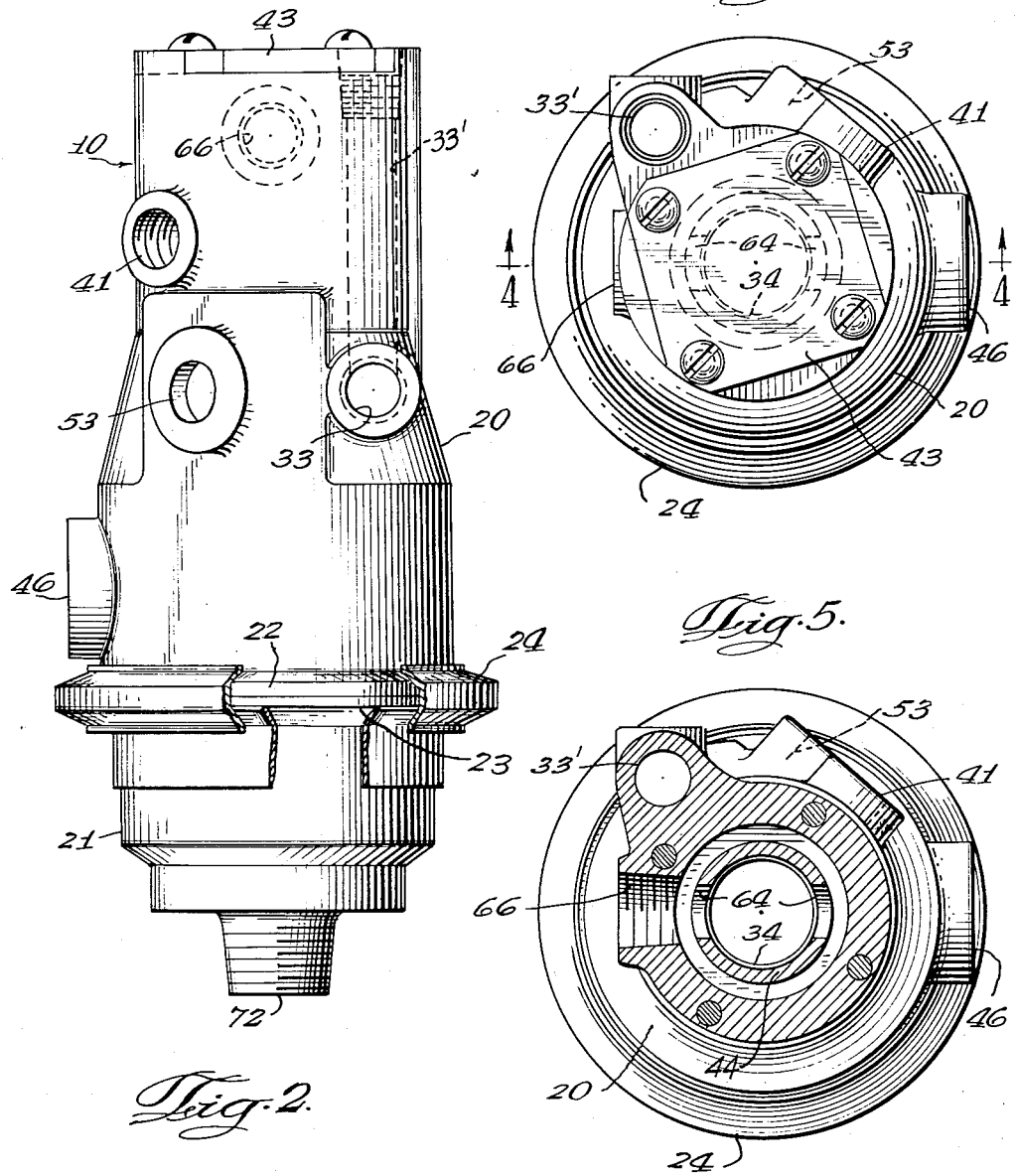

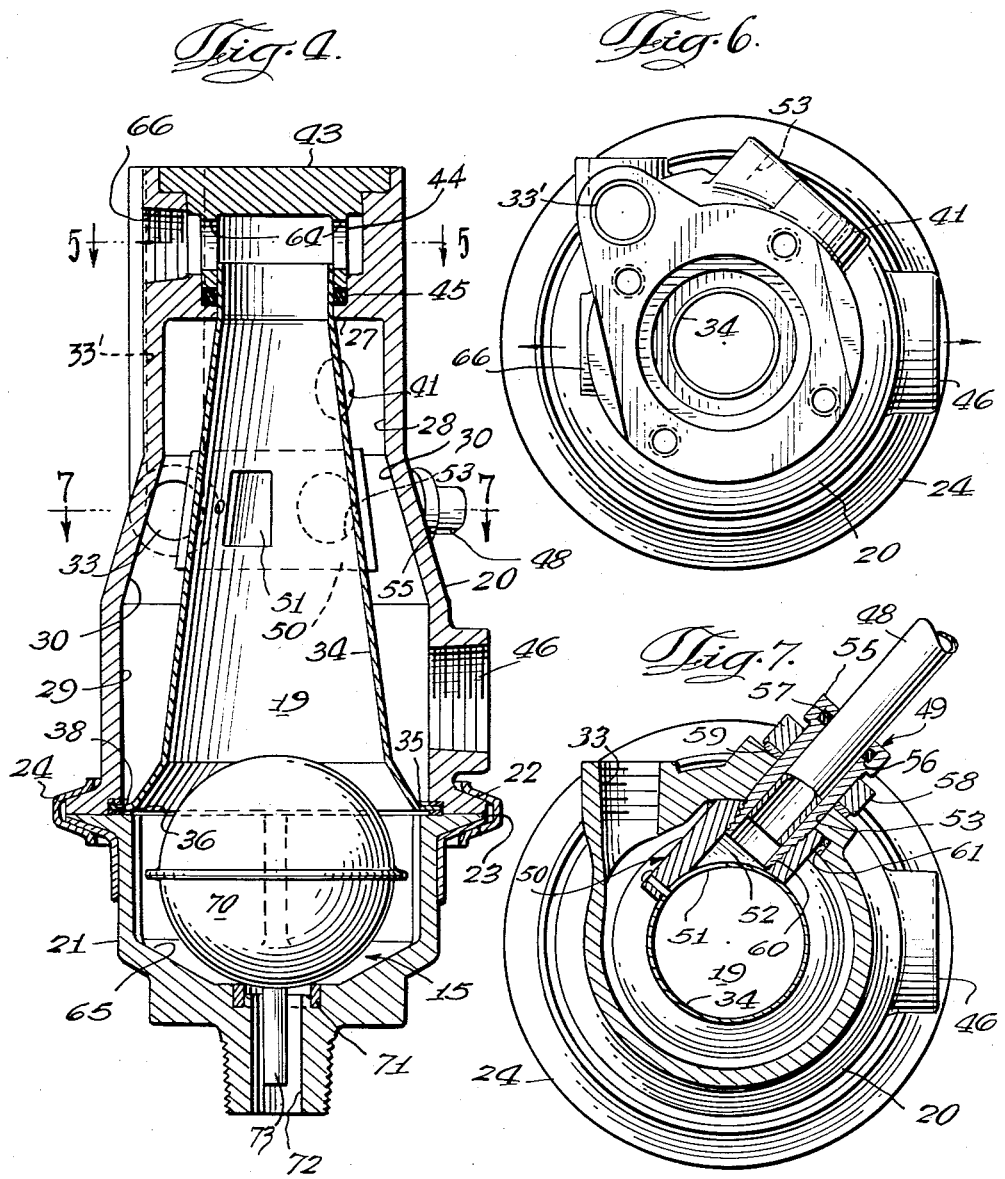

2,971,606
VAPOR SEPARATOR

Alfred Vischer, Jr., Park Ridge, Ill. (% Vischer Products Company, 2815 W. Roscoe St., Chicago 18, Ill.), assignor of small percentages to various assignees Filed Jan. 10, 1958, Ser. No. 708,259

9 Claims. (Cl. 183—41)

The present invention relates to vapor separators, and more particularly to steam separators which are particularly applicable for use in systems which intermittently require large quantities of steam in a short time.

Pressure cookers of a type suitable for use in kitchens of restaurants are provided with an external source of steam so as to enable the heating of the vessel to a desired temperature in a very short period of time. Since the cooker has a relatively high mass and is ordinarily cool when food is placed therein for cooking, a considerable amount of steam is required to bring the pressure and temperature of the cooker up to the necessary levels for proper cooking. Once, however, that these values of pressure and temperature are reached, the external source of steam need supply only enough steam to cook the food and restore the losses of the system.

In order to improve the efficiency of operation of pressure cookers of this type, it is desirable to supply relatively pure steam to the cooking vessel, and therefore, some means must be connected in the line between the steam source and the vessel to remove water droplets and other particles of dirt from the steam before it enters the cooker. It has been found, however, that the steam traps and steam separators which are found in the prior art are unsatisfactory for this purpose. Although there are many different types of steam separators in the prior art which, for most purposes, satisfactorily cleanse the steam which is passed through them, the primary disadvantage of such devices when used in pressure cooker systems is that they cool off during the times when the cooker is idle and require a large amount of steam to again bring them up to temperature. Since pressure cookers are operated only intermittently even in the largest of kitchens, each time that a pressure cooker is initially connected to the source of steam at the beginning of a cooking cycle, a considerable period of time is wasted in bringing the steam separator up to temperature and, of course, a considerable amount of steam is expended in so heating the separator. Since the only satisfactory method of determining when the food in a pressure cooker is properly cooked is by measuring the cooking time, it is particularly important that the temperature and pressure be quickly raised to the proper cooking levels. Otherwise, appreciable variations in the degree of cooking of the food may result. Therefore, while steam separators of the prior art type are used in many applications to remove undesired water particles and other dirt from steam, such devices cannot be used with any great degree of success in pressure cooker systems.

Therefore, a principal object of the present invention is to provide a new and improved steam separator.

Another object of the present invention is to provide a new and improved steam separator which may be used with systems operating into an intermittent load.

A further object of the present invention is to provide a new and improved steam separator which is small in size, compact and durable in construction and reliable in operation.

A still further object of the present invention is to provide a steam separator for use in pressure cooker systems.

Briefly, the above and further objects are realized in accordance with the present invention by providing a steam separator including two adjacent chambers separated by an imperforate, heat conductive wall. At least one of the chambers is a centrifugal separating chamber and connected to a load. The other chamber is connected to a source of raw steam and a valved conduit selectively interconnects the two chambers so that steam is supplied to the load when the conduit is open and no steam is supplied to the load when the conduit is closed. Also, when the valved conduit is closed so as to disconnect the steam source from the load, and moreover, the load is opened to the atmosphere, the chamber which is connected to the load may readily be drained of the collected condensate but the temperature in that chamber is, nevertheless, maintained at substantially the temperature of the steam by virtue of the fact that the adjacent chamber remains connected to the source of steam.

In a preferred embodiment of the present invention a two-stage separator is provided. This separator comprises a pair of concentrically disposed separating chambers, the inner chamber being connected to the load and housing a float operated drain valve and the outer chamber being connected to the source of steam. By connecting the outer chamber to the steam source, loss of heat by the separator to the ambient does not appreciably reduce the temperature in either of the chambers.

Further objects and advantages and a better understanding of the present invention may be had from the following detailed description taken with reference to the accompanying drawings, in which:

Fig. 1 is a side elevational view of a portion of a pressure cooking system or the like showing the steam separator of the present invention in cross section;

Fig. 2 is an elevational view of a vapor separator embodying the present invention;

Fig. 3 is a top plan view of the separator shown in Fig. 2;

Fig. 4 is a sectional view taken along the line 4—4 of Fig. 3;

Fig. 5 is a sectional view taken along the line 5—5 of Fig. 4 assuming the entire device to be shown therein;

Fig. 6 is a top view of the device of Fig. 4 with the cover 43 removed, assuming the entire device to be shown therein; and Fig. 7 is a sectional view taken along the line 7—7 of Fig. 4 assuming the entire device to be shown therein.

Referring now to the drawings and particularly to Fig. 1 wherein is shown a pressure cooking system including a steam separator 10, a pressure cooker 11 and a conduit 12 which is connected to a source of natural steam (not shown). In order to provide clean steam for the cooker 11, the steam separator 10 is interconnected between the conduit 12 and the pressure cooker 11 and principally comprises two independent separating chambers designated 18 and 19, respectively. These chambers constitute first and second separating stages which are interconnected through a suitable solenoid operated valve 14. In operation, after the food to be cooked has been placed in the pressure cooker and the cooker has been sealed to the atmosphere, the solenoid valve 14 is opened to permit steam from the conduit 12 to flow through the first stage separating chamber 18, thence through the interstage valve 14, through the second stage separating chamber 19 and into the pressure cooker 11.

Water, dirt particles and the like which are removed from the steam in the separating chamber 18 may drain through a steam trap 16 to a suitable reservoir or to the sewer. Whenever the solenoid valve 14 is closed and the cooking chamber in the pressure cooker 11 is open to the atmosphere, water, dirt particles and the like which are collected in the second stage separating chamber 19 may drain through a drain valve 15 and a line 17 to the reservoir or sewer.

Considering the separator 10 in greater detail and referring particularly to Figs. 2 through 7, the separator 10 comprises a two-piece housing including upper and lower members 20 and 21. Preferably, the members 20 and 21 are castings and respectively include annular flanges 22 and 23 which have flat abutting faces and which are adapted to be received in a conventional annular clamping band 24 which includes a locking means (not shown) for adjustably securing together the ends of the band.

The upper housing member 20 is provided with a central bore into which protrudes an annular flange 27. The flange 27 is located near the top of the housing, and below the flange 27 the core is constituted by three adjoining portions, a first cylindrical portion 28 directly below the flange 27, a second cylindrical portion 29 at the bottom of the member 20 and a conical portion 30 interconnecting the portions 28 and 29. An inlet port and associated boss 33 (Fig. 1) is provided in the wall of the housing member 20 within the confines of the conical portion 30, and the inlet conduit 12 is threadedly received therein. Also, a port 33' is drilled in the upper housing member 20 and interconnects the port 33 and the top of the housing to permit top feed to the separator 10 if desired. In the illustrated embodiment of the invention, however, the port 33' is plugged. A thin-walled tubular metallic member 34, which is generally of frusto-conical construction, has the upper portion thereof tightly received in the bore of the flange 27. An annular flange 35 at the bottom of the tube 34 is received in a counterbore 38 in the upper housing member 20 and seats on an annular shoulder 36 on the lower housing member 21. Suitable gaskets are disposed between the opposite sides of the flange 35 and the adjoining portions of the housing members 20 and 21 to seal the separating chambers 18 and 19 from one another.

A first stage outlet port 41, provided in the wall of the upper housing member 20, opens into the cylindrical bore portion 28 and is connected through a suitable conduit 42 to the solenoid valve 14. As best shown in Figs. 1 and 4, a cap 43 is mounted in a counterbore at the top of the housing member 20 and includes a sleeve-like barrel portion 44 which partially surrounds the upper end of the tube 34. A sealing gasket 45 is compressed between the upper end portion of the tube 34 and the adjacent portion of the housing member 20, thereby to seal the chambers 18 and 19 from one another.

In accordance with the present invention the first stage separating chamber 18 is in the general shape of a conical annulus and as steam enters the inlet port 33 under pressure from the conduit 12, it engages the conical wall portion 30 along a tangential plane and swirls in the well known manner to cause the heavy particles, such as water droplets, to move downwardly within the chamber 18 and the steam to flow through the outlet port 41 near the top of the chamber. A first stage drain port 46 is provided in the wall of the housing member 20 near the bottom thereof and a drain conduit 47 is threadedly connected thereto. In order to drain the condensate from the chamber 18 without undue loss of steam, a conventional steam trap 16 is interconnected between the drain conduit 47 and a sewer or the like. In this manner as water accumulates in the bottom of the first stage separating chamber, it periodically causes a valve in the trap 16 to open and drain the condensate from the chamber.

Assuming that the solenoid valve 14 is opened so that steam is to be supplied to the pressure cooker 11, the steam which has passed through the separating chamber 18 travels through the solenoid 14, a conduit 48, a sleeve connector 49, a coupling member 50, and a slot 51 in the wall of the tube 34 to the second stage separating chamber 19. The connector 50 is secured to the tube 34 as by welding or silver soldering and a hole 52 through the connector 50 opens onto the slot 51 so that, as best shown in Fig. 7, the steam enters the chamber 19 along a plane which is substantially tangential to the chamber wall. Accordingly, the steam which enters the chamber 19 swirls in a counterclockwise direction as viewed in Fig. 7.

In order to transmit steam from the conduit 48 to the hole 52, a second stage inlet port 53 is positioned in the wall of the housing member 20 opposite the hole 52 and the threaded sleeve 49 has a head 55 with an annular groove 56 therein for housing a resilient sealing gasket 57. The gasket 57 seals the sleeve 49 to the conduit 48 which partially extends into the bore thereof. A nut 58 has an undercut face which receives a resilient gasket 59 that is compressed against the wall of the housing member 20 to seal the sleeve 49 to the housing member 20. A taper 60 is provided on the end of the sleeve 49, the taper 60 being threadedly received in the hole 52 to seal the sleeve 49 to the connector 50.

For the purpose of facilitating assembly of the separator, a keyway 61 is provided in the conical portion 30 of the bore in the housing member 20 and the connector 50 is received therein to insure proper alignment of the connector 50 with the second stage inlet port 53.

The member 50 and the slot 51 are so oriented that the steam which passes therethrough and enters the chamber 19 travels tangentially of the inner surface of the tube 34. Accordingly, the steam swirls within the chamber 19 and the heavier particles such as the water droplets go to the bottom of the chamber and collect in a recess 65 in the lower housing member 21, the clean steam passing through a plurality of suitable apertures 64 in the cap barrel 44 to an outlet port 66 at the top of the housing. As best shown in Fig. 5, the external diameter of the barrel 44 is substantially less than the diameter of the bore of the housing member 20 adjacent the apertures 64 thereby to provide an annular passageway which connects all of the apertures 64 to the outlet port 66. The clean steam which flows through the outlet port 66 is then connected through a suitable conduit 67 to an apertured diffusion tube 68 in the pressure cooker 11. The tube 68 may be mounted at the top of the vessel and provided with downwardly facing apertures to direct the clean steam directly on a tray of food to be cooked.

Referring to Figs. 1 and 4, the drain valve 15 for the second stage separating chamber 19 comprises a hollow, spherical float 70 which functions as a valve member and seats on an annular valve seat 71. The seat 71 surrounds a drain port 72 which is connected to the drain line 17. Accordingly, when the upward pressure on the float 70 exceeds the downward pressure thereon, the float 70 lifts up off the seat 71 and any water which has collected in the recess 65 may flow out through the port 72.

Preferably, the float 70 is a metallic sphere and its minimum size is limited, first, by the inherent weight thereof, and second, by the degree of flotation which is desired. Moreover, it is desirable in order to prevent fluctuation of the pressure therein that the valve 15 be closed whenever the cooker 11 is pressurized. However, it is also important that the valve 15 be opened to exhaust even relatively small amounts of condensate when the cooker 11 is opened to the atmosphere. Consequently, the flow area through the seat 17 is quite large being, for example, about one-fifth the maximum cross sectional area of the float 70. In this manner, the high force exerted on the float 70 by the high pressure steam prevents opening of the valve 15 during the cooking cycle, but since a float having a high degree of flotation may be employed, only a small quantity of condensate in the reservoir 65 will cause it to float off the seat 71. If desired, a straight rod 73 may extend from the float 70 into the port 72 to prevent the seam on the float from moving to a position opposite the seat 71.

Consider now a typical cooking cycle of operation. A tray of food to be cooked is placed on a support rack in the vessel of the cooker, the cover of the cooker is closed to seal the vessel from the atmosphere and the valve 14 is opened. Raw steam at a predetermined pressure then passes from the conduit 12 into the steam separator 10 and clean steam flows through the conduit 67 into the pressure cooker 11 until a predetermined pressure is reached in the cooker. The valve 14 remains open and the pressure in the cooker is maintained at the predetermined value until the termination of a predetermined partial cooking time. When this predetermined partial cooking time has expired, the valve 14 is closed by a suitable timing apparatus (not shown) thereby to disconnect the pressure cooker 11 from the source of natural steam. At this same time a vent (not shown) in the pressure cooker 11 is opened to exhaust the steam in the cooker to the atmosphere and thereby to permit opening of the pressure cooker door and removal of the cooked food from the cooker. Therefore, with the exhaust vent or the door open and the solenoid valve closed, the pressure cooker and the second stage separating chamber 19 are at atmospheric pressure whereby the float valve 15 may open to permit any water which has been collected in the chamber 19 to drain off. Ordinarily, the cooker 11 will remain in this condition for some time. However, the wall of the second stage chamber 19 is maintained at steam temperature by the steam which is located in the closely adjacent chamber 18. Therefore, when the next cooking operation is initiated in the above described manner, no time is lost or steam expended in heating the separator 10 to the temperature of the steam.

The present invention thus provides a compact, durable, highly efficient steam separator which is maintained at steam temperature irrespective of the condition of operation of the system and which is automatically drained of condensate without lowering the pressure of the load.

While the invention has been described by means of a particular embodiment thereof, it will be understood that those skilled in the art may make many changes and modifications without departing from the true spirit and scope of the invention, and accordingly, all such changes and modifications which fall within the true spirit and scope of this invention are intended to be covered in the appended claims.

What is claimed as new and desired to be secured by Letters Patent of the United States is:

1. A two-stage steam separator comprising a housing refining an annular, vertically disposed, first stage separating chamber, a passageway communicating with said chamber intermediate the top and bottom thereof for admitting steam thereto, said passageway opening into said chamber substantially along a tangential plane thereof to cause said steam to swirl in said chamber, a drain line including a steam trap near the bottom or base end of said chamber for emitting water and other particles from said chamber, a steam outlet conduit opening into said chamber near the upper end thereof for emitting steam from said chamber, a hollow, thin walled, heat conductive member centrally disposed in said chamber, said member defining therein a conical, second stage separating chamber which is substantially concentric with said first stage separating chamber, sealing means interconnected between said first and second stage separating chambers for isolating them one from the other, a passageway opening into said second stage separating chamber substantially along a plane tangential to the conical surface defined by the wall of said second stage separating chamber, a steam carrying connection between said last-named passageway and said steam outlet conduit, a shut-off valve disposed within said connection for interrupting the passage of steam from said first stage separating chamber to said second stage separating chamber, a drain valve located in the bottom of said second stage separating chamber for emitting water and other particles from said second stage separating chamber, and a steam outlet connected to said second stage separating chamber near the top thereof for connecting said steam separator to a load.

2. A two-stage vapor separator comprising a first stage separating chamber defining structure, a second stage separating chamber defining structure, said chambers being substantially concentric and separated by an imperforate, good heat conducting member thereby to provide a relatively high degree of heat transfer between said chambers, an interstage passageway through which said chambers are interconnected, valve means disposed in said passageway for controlling the passage of fluid between said chambers, a plurality of drain valves, said drain valves being respectively connected to said chambers, a float disposed in the bottom of said second chamber for operating the drain valve in said second chamber, an inlet duct to said first stage chamber for supplying pressurized vapor thereto and an outlet duct from said second stage for supplying cleansed vapor to a load.

3. A two-stage vapor separator as set forth in claim 2 wherein said chambers are each partially defined by generally conical walls.

4. A vapor separator, comprising a two part housing having an upper portion and an interfitting lower portion, a tubular member mounted within the upper portion of said housing and having an outwardly extending flange seated between said upper and lower portions of said housing, said tubular member cooperating with said upper portion to define a first centrifugal separating chamber, said tubular member cooperating with said lower portion to define a second centrifugal separating chamber, an inlet in said upper portion for supplying vapor to said first chamber, an outlet in said upper portion for exhausting vapor from said second chamber, a passageway at least partially formed in said upper portion connecting an outlet of said first chamber to an inlet of said second chamber, and a valve mounted in said lower portion for draining condensate from said second chamber.

5. A vapor separator as set forth in claim 4 further comprising means for securing said portions together and for clamping said flange between said portions to secure said tubular member in place within said housing.

6. A vapor separator comprising a housing, a tubular member disposed within said housing, a first sealing means interposed between one end of said tubular member and said housing, a second sealing means interposed between the other end of said tubular member and said housing, said tubular member and said sealing means dividing said housing into two substantially coextensive separating chambers, an inlet extending through said housing between said sealing means to one of said chambers at a location substantially removed from the top thereof, an outlet extending through said housing to the top of the other of said chambers, and a conduit interconnected between the top of said one chamber and a location in said other chamber substantially removed from the top thereof.

7. A vapor separator comprising a pair of concentrically arranged centrifugal separating chambers, the outer chamber being a narrow annulus tapering inwardly toward the top, means for supplying vapor tangentially to the outer chamber near the bottom thereof to cause said vapor to swirl in said outer chamber, means for extracting vapor from the top of said outer chamber and supplying it tangentially to the inner chamber near the bottom thereof to cause said vapor to swirl in said inner chamber and a vapor outlet connected to the top of said inner chamber for extracting vapor from said separator.

8. A vapor separator as set forth in claim 7 wherein said inner chamber is substantially frusto-conical, being tapered inwardly toward the upper end thereof.

9. A vapor separator, comprising a housing enclosing a vertically disposed annular separating chamber, said chamber being tapered inwardly toward the top and being narrow in section, a vapor inlet extending through said housing and oriented to supply vapor into said chamber in a tangential direction to cause said vapor to swirl in said chamber with the heavier particles thereof concentrating toward the periphery of said chamber, said inlet being located intermediate the top and the bottom of said chamber, a vapor outlet extending through said housing and connecting to said chamber near the top thereof, and a condensate outlet connected to the bottom of said chamber and extending through said housing for draining condensate and other particles from said chamber.

References Cited in the file of this patent

UNITED STATES PATENTS

| | | |
|---|---|---|
| 395,184 | Simpson | Dec. 25, 1888 |
| 515,105 | Baum | Feb. 20, 1894 |
| 564,481 | Gaiennie | July 21, 1896 |
| 813,486 | Dillon | Feb. 27, 1906 |
| 1,380,698 | Anspach et al. | June 7, 1921 |
| 1,461,174 | Bennett | July 10, 1923 |
| 1,797,232 | How | Mar. 24, 1931 |
| 2,288,245 | Kopp | June 30, 1942 |
| 2,825,317 | Tacchella et al. | Mar. 4, 1958 |

FOREIGN PATENTS

| | | |
|---|---|---|
| 506,149 | Germany | Aug. 29, 1930 |
| 845,701 | France | May 22, 1939 |